Figure 4:
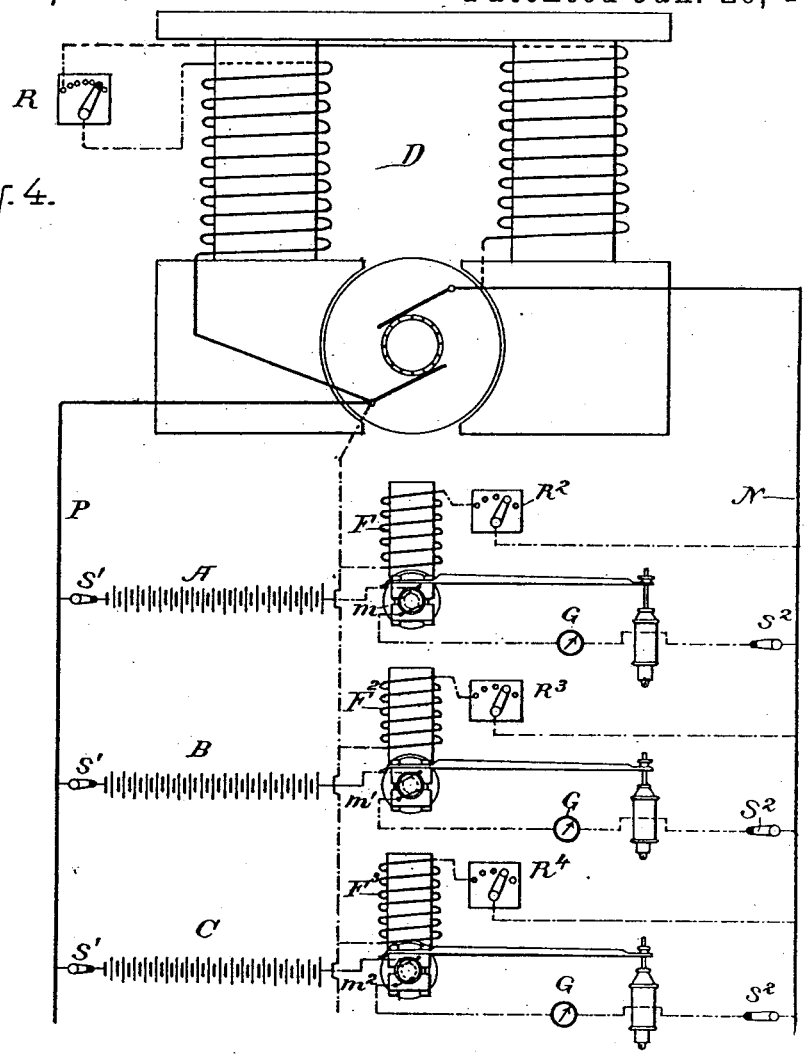

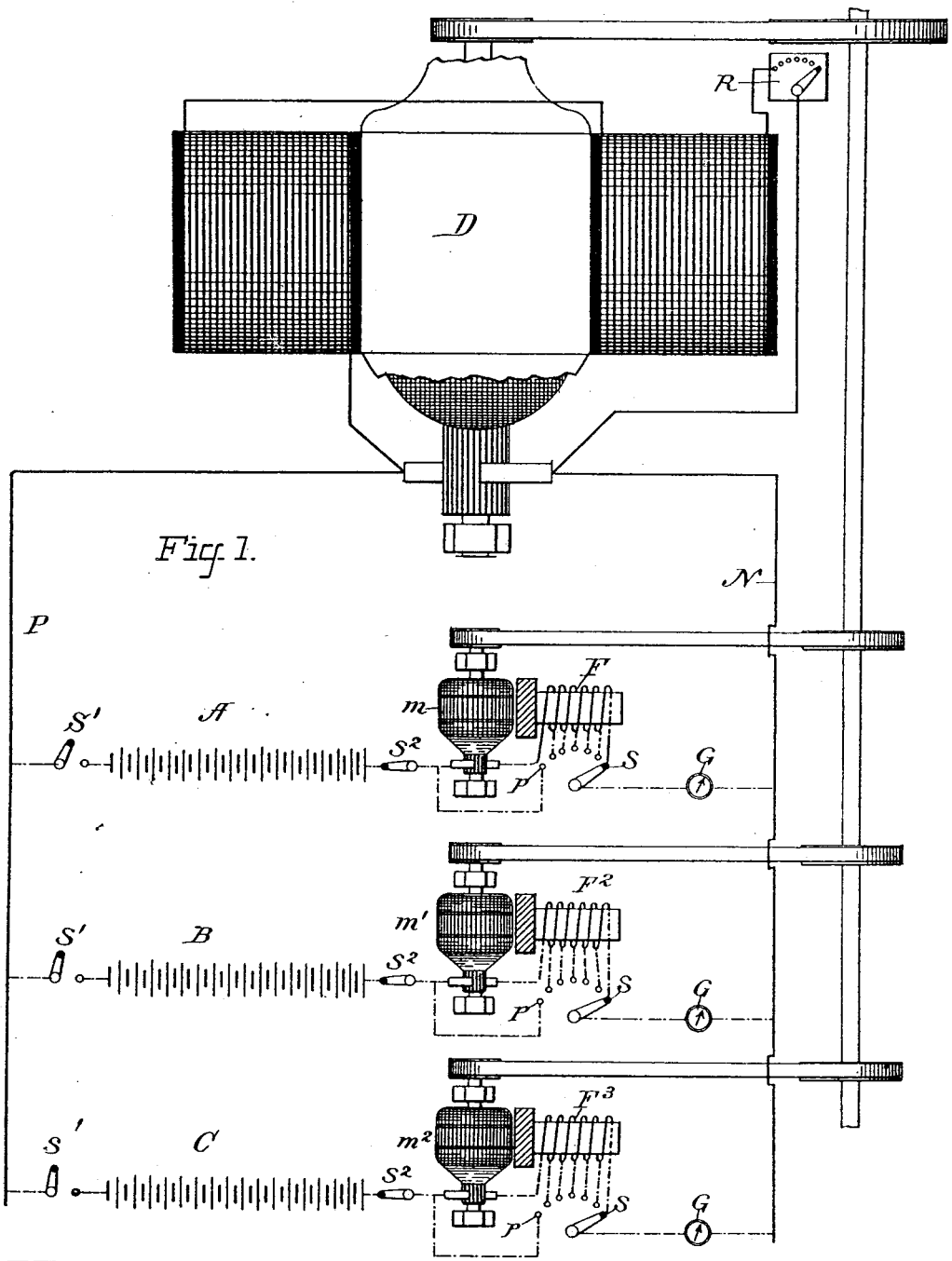

(No Model.) 3 Sheets—Sheet 2.
C. O. MAILLOUX.
APPARATUS FOR CHARGING SECONDARY BATTERIES.
No. 467,544. Patented Jan. 26, 1892.
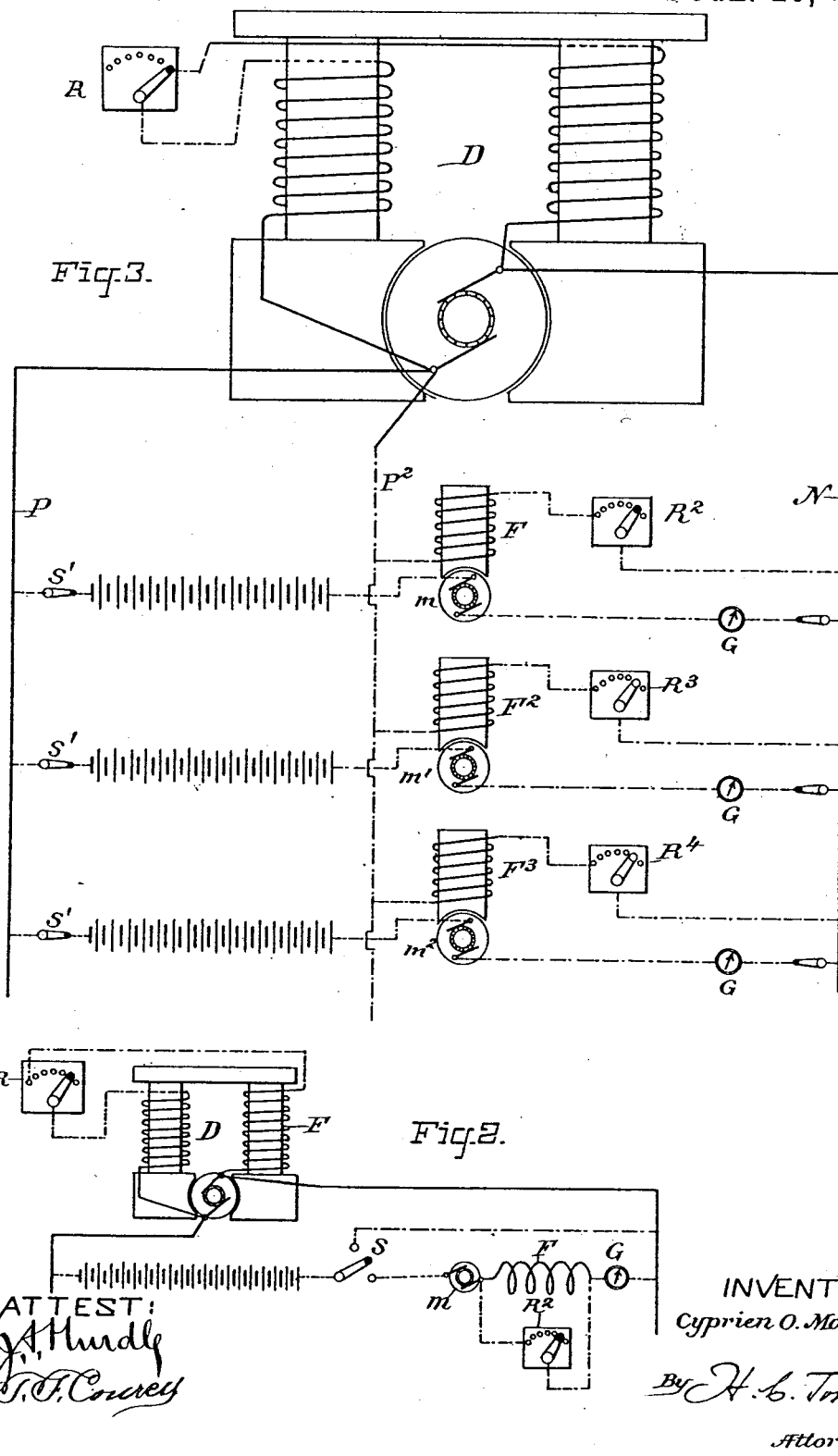

(No Model.) 3 Sheets—Sheet 3.

C. O. MAILLOUX.
APPARATUS FOR CHARGING SECONDARY BATTERIES.

No. 467,544. Patented Jan. 26, 1892.

ATTEST:
J. A. Hundle
T. F. Conrey

INVENTOR:
Cyprien O. Mailloux
By H. S. Townsend
Attorney

UNITED STATES PATENT OFFICE.

CYPRIEN O. MAILLOUX, OF NEW YORK, N. Y.

APPARATUS FOR CHARGING SECONDARY BATTERIES.

SPECIFICATION forming part of Letters Patent No. 467,544, dated January 26, 1892.

Application filed April 24, 1891. Serial No. 390,277. (No model.)

*To all whom it may concern:*

Be it known that I, CYPRIEN O. MAILLOUX, a citizen of the United States, and a resident of New York, in the county of New York and State of New York, have invented certain new and useful Apparatus for Charging Secondary Batteries, of which the following is a specification.

My invention relates to apparatus for charging secondary or storage batteries employed for electric-railway traction or other industrial uses.

The principal object of my invention is to provide a simple and effective apparatus whereby the charging-current may be regulated or controlled according to the state of the charge of the battery or the number of cells in series therein, and is especially useful in those cases where the charging has to be done on a large scale and a large number of batteries may be in course of charging at once.

As is well known in the art, the electromotive force of a storage-battery gradually rises during the charging operation and practically reaches its maximum at or about the close. It therefore becomes desirable to provide some means whereby the charging-current may be kept up to the proper strength for charging the battery expeditiously, and also to provide for the charging of batteries of different numbers of cells in series. It is also desirable to provide for the variation of the amount of current flowing through the battery at different stages of the charging operation, or, in other words, to vary the rate of charge. Thus, for instance, it is frequently desirable to permit the charging-current to flow at the beginning of the operation at a more rapid rate than at the close, the amount of the current and the rate of charge being varied from the greatest to the least, and the change in the rate of charge or amount of current being produced by one or more stages or steps.

To provide for varying the flow of current in the battery to be charged, it has heretofore been the practice to use dead-wire resistances, which oppose the flow of the current because of the low conductivity of the material composing them, and to cut said resistance into and out of the circuit, as may be required, to vary the flow of current. Inasmuch as it is necessary to use a much higher potential of the charging source at the close of the operation than at the beginning it follows that in the use of such resistances at the beginning of the operation a large amount of current must be wasted in heating effects. The resistance devices heretofore employed are objectionable for this reason, as well as on account of their cumbersomeness and the complication of apparatus required. The main object of my invention is to dispense with the use of such resistances and to permit a number of batteries to be charged at the same time from the same common charging source, and yet to have their charging-currents adjusted or adapted to different states of charge of the different batteries.

My invention consists, essentially, of an apparatus for charging storage-batteries comprising charging mains or leads having a definitely-maintained potential from any source or sources, branches therefrom containing means for putting the storage-batteries into circuit between said mains, and in each branch a means for varying, controlling, or regulating a supplemental electro-motive force acting to supplement either or both the direct electro-motive force of the charging-current or the counter electro-motive force of the battery charged, for the purpose of adjusting the current-flow to the number of cells in series or for regulating or controlling the current as the electro-motive force of the battery rises with its charge. The charging mains or leads may be supplied with the charging energy from one or more dynamo-machines connected in multiple thereto or by other means. The supplemental or auxiliary electro-motive force is preferably that of the armature for a dynamo machine or motor acting as will be hereinafter more particularly described. The electro-motive force of such armature, acting as a generator to assist the charging-current or as an opposing electro-motive-force generator to assist the counter electro-motive force of the battery, may be graduated or regulated to the various states of charge of the battery by varying the electro-motive-force capacity of said armature in any desired way—as, for instance, by varying the strength of its field, or, in the case of a motor driven by the current, varying its speed by changing its load or otherwise.

When the supplemental electro-motive force is one which assists the main-charging dynamo or source, the potential of the latter need be that only suitable to the beginning of the charging operations, whereas in the old methods of charging the potential had to be greater than was necessary for the beginning of the operation and adjusted or adapted to that required for the end, while the surplus energy at the beginning of the operation was wasted in heat.

If the armature of the supplemental electro-motive-force generator is so related by the polarity of its magnetic field to operate as a generator assisting the main-charging current, the potential difference of the source of supply may be, if desired, and is preferably, taken somewhat lower than what is adequate to force current through the battery in opposition to the counter electro-motive force and resistance in the said battery. This initial electro-motive force is then raised or supplemented by the action of the auxiliary armature included in the circuit until the sum of the two electro-motive forces, initial and supplemental, becomes sufficient to send the desired current through the respective branch of circuit in opposition to the counter electro-motive force and resistance encountered therein. It is well known that as the operation of charging secondary batteries proceeds their electro-motive force rises, so that they oppose to the initial electro-motive force of the source of supply a constantly-increasing power. If it is desired to maintain the charging-current constant, it can be done simply by increasing the action of the armature as a generator to the proper extent. In fact, by either changing the speed or strength of magnetic field of the supplemental generator the charging-current can be governed and controlled with certainty and independently of any changes in the initial or the counter electro-motive forces involved. This change of the speed or magnetic-field strength may be effected in various ways, as will be shown further. By simply reversing the polarity of its magnetic field and running it as a motor the supplemental armature becomes related differently to the initial and counter electro-motive forces involved. Its action will now supplement the counter electro-motive force of the battery instead of the initial electro-motive force of the source of supply. In this case the initial electro-motive force is preferably made as high as or higher than the highest value that will be required to force a current through the groups of cells when the said cells have reached the phase of highest counter electro-motive force, such as toward the end of the charging process. The electrical energy expended in this motor and giving it rotation and capacity to do mechanical work is abstracted from the branch circuit in which the armature is connected and causes a counter electro-motive force in said branch in the same direction as the counter electro-motive force of the cells being charged. Hence by raising the counter electro-motive force of the motor the effect is the same as raising the counter electro-motive force of the battery itself—namely, the available electro-motive force (which is the difference between the initial and counter electro-motive forces) is reduced, and consequently the charging-current is also reduced. At the beginning of the charge when the cells oppose the least counter electro-motive force the counter electro-motive force of the motor would be allowed to go higher. As the charging proceeds and the counter electro-motive force of the cells rises, the counter electro-motive force of the motor would be diminished. Thus it will be seen that by regulating the counter electro-motive force of the supplemental armature—such as by changing its speed—the strength of its magnetic field, the position of the brushes, or in any other way well known in the art, the charging-current can be controlled or changed to any desired extent. The regulation can be controlled so as to maintain the charging-current constant, if desired, or it may be increased or diminished at any desired rate. Thus, for instance, the electro-motive force of the armature might be decreased with the increase of counter electro-motive force of the battery, but at a less rate, so that the difference of potential available for charging and the resultant current diminish slightly toward the close of the operation. Conversely the rate of charging toward the end might be increased by decreasing the electro-motive force of the motor at a relatively greater rate. The energy expended in the motor is not totally wasted, as in the case of a dead resistance heretofore used instead, but is available for use by being reconverted into mechanical energy and can be utilized in various ways, the only losses being those incident to conversion.

Having set forth the general principles of my invention, I will now proceed to describe it more in detail, and with reference to the accompanying drawings, which form part of this specification.

Figure 5:
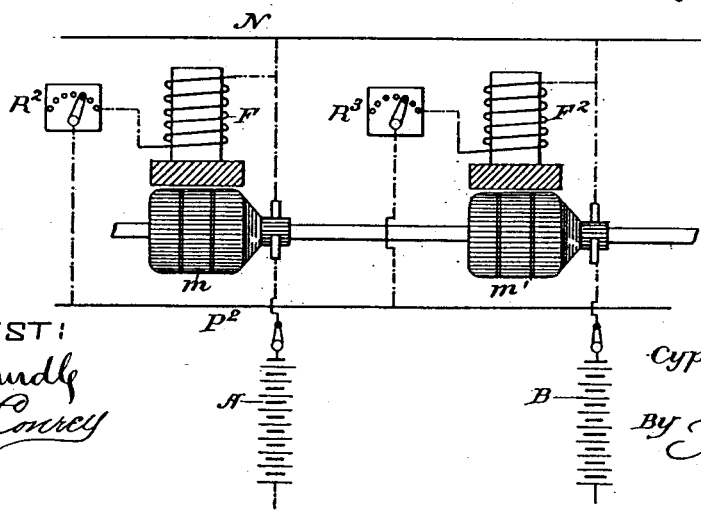

In the accompanying drawings, Figure 1 is a diagram of apparatus embodying my invention. Fig. 2 illustrates simply a modification in the manner of controlling the electro-motive force of the armature which assists the charging or the counter electro-motive force. Fig. 3 illustrates a modification in the connection of the field-magnets for the supplementary armatures. Fig. 4 is a side elevation of the supplemental electro-motive-force source provided with means for giving the same a constant load when it consists of a motor run by the charging-current. Fig. 5 illustrates a modification in the manner of connecting two armatures, one acting as a generator of electro-motive force to assist the charging-current and the other as a motor-generating counter electro-motive force assisting that of the battery.

The diagrams are merely symbolical of the devices and appliances employed, the latter being all well known and understood in the art and capable of variation in their details indefinitely.

Referring to Fig. 1, P N are the charging mains or leads having a definite maintained electrical potential produced from any source or sources—as, for instance, from a dynamo-electric machine D. This dynamo is preferably constructed to automatically maintain a potential on the leads and may be of the shunt-wound type, having a controlling-rheostat R in the shunt-circuit, including the field-magnet coils, to permit the electro-motive force generated to be controlled and regulated. Several such dynamos may of course be connected to the same charging-circuit P N, just as is done in feeding a given set of mains from a central station comprising several dynamos.

A B C represent three several batteries or groups of batteries to be charged from the mains or leads P N, and S' S² suitable connecting devices—such, for instance, as electric switches—for placing them in connection with the mains in the ordinary or any suitable manner.

G G G are suitable current-measuring devices.

In the several connections leading from the mains to the batteries are placed the armatures of small dynamo-electric or electro-dynamic machines, which are preferably series wound. F' F² F³ are the field-magnet coils, and $m$ $m'$ $m^2$ the armatures of said machines. As already stated, the field and armature of each machine may be so related that the armature shall be capable of working as a generator or as a motor, and to supplement by its electro-motive force the charging electro-motive force or the counter electro-motive force of the battery. To conveniently vary its electro-motive force, a switch S may be provided to change the number of coils in action in the sectional field-magnet coil of the machine, as indicated. Each switch S may, if desired, have a contact-point $p$, by which charging-current may be fed direct to the battery without passing through the armature.

If the armature of the machines $m$ $m'$ $m^2$ be used as a generator of electro-motive force assisting that of the charging-mains, then mechanical power is provided from any suitable source—as, for instance, the prime mover operating the dynamo D—for rotating said armature. In this case the potential difference between the leads P and N is purposely made somewhat lower than enough to force current through the batteries. If preferred, it may be made just sufficient to force the proper charging-current through the cells when they are beginning to be charged, at which time their counter electro-motive force is usually considerably lower. In such case the switch S is turned to connect at $p$ and cut out the supplemental machine. After the operation of charging has proceeded for a time, the length of which depends upon the conditions of the case, the charging-current, as will be shown at G, will become reduced in consequence of the rise in the counter electro-motive force of the battery. The switch S is then turned to the right a sufficient number of steps, allowing the armature-current to pass through armature $m$ and a certain number of turns of the field-coil F. The magnetic field of the supplemental machine now becomes partially excited and the rotation of the armature $m$ produces an electro-motive force, which assists that of the dynamo D and raises it to a definite extent so far as the particular series of cells in circuit with such supplemental machine is concerned. The farther to the right the switch S' is moved the stronger the magnetic field is made and the more the electro-motive force of the main source D is strengthened. After the charging has gone on for a certain further length of time and the charging-current becomes considerably reduced by the increased counter electro-motive force of the battery the assisting electro-motive force of the machine may be again increased by moving the switch-arm S. Any number of such adjustments may be provided for by suitable construction of the adjusting devices.

The power required to cause the rotation of the armature $m$ will vary in direct proportion with the electrical energy introduced into the branch of circuit including said armature $m$. Thus if the electro-motive force added by the small machine $m$ to the electro-motive force of the main source is ten (10) volts, and if the charging-current is twenty (20) ampères the small machine will supply two hundred (200) watts to the circuit and absorb from the prime mover a corresponding amount of energy besides the energy lost in conversion.

It will be understood that instead of three batteries or groups of batteries any desired number can be connected to the mains P N. It will also be seen that since each branch can be regulated individually and independently of the rest it is possible to charge batteries having an unequal number of elements connected in series from the same source D.

As shown in Fig. 2, instead of varying the number of turns of field-coils F in circuit by cutting them in or out of circuit, as in Fig. 1, a shunting-resistance R² may be used, which is connected to the terminals of the field-coil F. By varying the amount of resistance in the shunt branch or by-path a greater or smaller amount of current is diverted from the field-coil F, and thus the field magnetism produced by a given volume of current may be readily controlled.

In Fig. 3 I show a further modification, in which a shunt-wound instead of a series-wound machine is used in each branch circuit. The field-coils $F$ $F^2$ $F^3$ are here shown as connected to the mains $P^2$ N of the main dynamo D. The arrangement is virtually the same as that of a separately-excited machine, which could evidently be substituted also. The rheostat $R^2$ $R^3$ $R^4$, included in each shunt-circuit, serves, as will be readily understood, to vary the exciting-current passing through the field-coils $F$ $F^2$ $F^3$.

The manner of maintaining the field of the supplemental electro-motive-force source or of changing the electro-motive force acting in one or the other direction may be indefinitely varied without departing from my invention.

I have thus far described the small supplemental machine as so related to the charging-current that it operates as a dynamo-electric machine or generator. I will now describe the action of the same apparatus when related so as to act as an electro-dynamic machine or motor. The organization of devices and the connections remain exactly the same as before; but the electro-motive force of the main source of current D must be relatively higher instead of being lower than what is necessary to force the current through the groups of secondary cells. In this case the current sent into each branch causes the armature of the supplemental machine to turn as a motor. The electro-motive force of the small machine may be regulated exactly as before; but this electro-motive force is now in the contrary direction and opposes instead of assisting the electro-motive force of the charging-current supplied from dynamo D, thus practically assisting the counter electro-motive force of the battery being charged, and thereby practically reducing the potential difference available at the terminals of the series of cells to be charged. The greater the electro-motive force of the supplemental machine the lower will be the charging-current. Therefore, by regulating the electro-motive force of said machine the charging-current may be controlled and regulated in amount. By running a motor in the battery-circuit by means of the charging-current, as here illustrated, so as to allow its counter electro-motive force to assist that of the battery and by giving it a constant load, as by a friction-brake, the charging-current or rate of charging will be automatically maintained at a practically-constant point without adjusting the field or shifting the brushes of the motor. It is well known that if a current traverses a motor-armature the turning effort of the armature in the motor is independent of the speed, provided the strength of the current is maintained constant. Inversely, if the static movement tending to resist the motion of the armature is maintained constant the current will thereby automatically be kept constant, whatever means we may employ to vary it. Hence when the motor is in circuit with the battery, as shown, the increase of counter electro-motive force of the battery as it acquires charge and which would tend to cut down the current is compensated for by the action of the motor, whose speed will correspondingly vary and lessen until its counter electro-motive force decreases in amount enough to permit the same constant current flow to be maintained through it and the battery. It is seen, therefore, that so long as the magnetic field of the small machine remains constant the current-rate will be automatically maintained constant. If now the magnetic field be increased in any manner, as by turning the switch, the same turning effort, as experiment proves, will now require a smaller current through the armature. The speed of the motor will instantly increase until the counter electro-motive force is sufficient to choke the current down to this reduced amount, and this current-rate will be maintained constant as before. This action may be utilized in each of the several stages of the charging. Thus, for instance, the field may be adjusted to permit the current required for the initial stage of charging to flow through the armature, and while any given adjustment of field is maintained the battery will go on charging by a definite current or at a fixed rate which is automatically maintained by the action of the motor without any adjustment thereof. After the charging has been allowed to progress at such rate for the desired time the field may be adjusted to a greater strength, thus lessening the current which may flow, and the battery may be allowed to charge at such definite constant lower rate for the desired time, and so on to the final stage of charging.

The constant load of the motor may be maintained by a Prony friction-brake—such, for instance, as shown in Fig. 4—or the friction of the armature-shaft in its bearings might be utilized for the purpose. The adjustment of the current to different stages of the operation or to batteries of different resistance might be accomplished by other means—as, for instance, by shifting its brushes or otherwise. The method of automatically preserving a constant rate of charge of the battery by running the motor by the charging-current, but with a constant load, I do not herein specifically claim, as it forms the subject of another application for patent filed by me of even date herewith, Serial No. 390,278.

The product of the counter electro-motive force produced by the small machine into the current passing through the armature represents in watts the energy abstracted from the branch circuit and made available for conversion into mechanical energy of motion. Hence if the motor is belted or geared to the main dynamo D, or the prime mover supplying the power thereto, the mechanical energy resulting from the conversion will reduce by an amount equal to said energy the power required to drive the main dynamo.

It will be obvious that in practicing my invention it is not necessary to run all of the supplemental machines in the branches by a prime mover, so that they will act as generators, assisting the electro-motive force of the charging-main, or to operate them all as motors run by the charging-current, since some of them might be operated in one way and some in the other. In such case, however, it is obvious that the number of cells of battery capable of being conveniently charged in the several branches would differ, that branch in which the machine was run as an assister to the charging-current being adapted to charge batteries having a larger number in series. Otherwise the capacities of the several branches would be alike in their adaptability to adjustment of the charging-current to the various states of charge of the battery in each.

It is obviously not necessary in carrying out my invention that the supplemental generators in all the branches should be alike in their power, and they might be of normally-different capacity, in order that batteries having different numbers of cells in series might be charged conveniently from the same charging-mains. This difference in the normal capacity of the several supplemental generators employed may be used, whether they all be run as electric motors or as dynamo-electric generators. When one of the machines is used as an electric motor and another as a dynamo-electric generator, the two may be combined in one by mounting them upon the same shaft, as indicated in Fig. 5. The advantage of thus combining the generator and the motor armatures is that the power required to be taken from or returned to the prime mover is much less than by the other ways, being equal to the difference between the amounts of energy in action at each machine. In actual practical working, when a large number of batteries are at different phases of charge, the adjustments may be made such that practically very little power is transferred to or from the prime mover, the amounts absorbed and returned being nearly balanced, so as to nearly offset each other.

I do not claim in my present application the improvement in charging storage-batteries which consists in varying a supplemental electro-motive force acting with the direct or counter electro-motive force, or both, in accordance with the degree of charge and counter electro-motive force of the battery, as this forms, generally, the subject of another application for patent filed by me of even date herewith, Serial No. 390,275, and my present application is designed to cover one only of the organizations of apparatus that may be employed in practicing that invention.

What I claim as my invention is—

1. In an apparatus for charging storage-batteries, the combination, substantially as described, of mains or leads having a definite or maintained electric potential obtained from any source, means for placing storage-batteries in branches from one to the other of said mains, and a supplemental or auxiliary electro-motive-force generator in each branch adapted to assist the applied or the counter electro-motive force and variable in effect independently of the battery and the charging source, as and for the purpose described.

2. In an apparatus for charging storage-batteries, the combination, with one or more main charging-dynamos, of charging leads or mains supplied thereby, and charging branches of said mains, each containing an armature of regulable capacity as an electro-motive-force generator.

3. In an apparatus for charging storage-batteries, the combination, with a main charging dynamo or dynamos supplying suitable leads or mains and means for connecting storage-batteries in multiple to said mains, of supplemental armatures in the branches acting as counter-electro-motive-force generators, each assisting the counter electro-motive force of the battery in circuit with it and each of regulable power in accordance with the progress of the charge and consequent increase of counter electro-motive force of the battery.

4. In an apparatus for charging storage-batteries, the combination, with the mains or supply-wires having a definitely-maintained charging potential, of the charging branches from said mains to the charging-batteries, and an armature in each of said branches revolving in a regulable magnetic field.

5. In an apparatus for charging storage-batteries, the combination, substantially as described, of one or more charging-dynamos supplying leads with a definite maintained charging potential, an armature placed in each of a number of branches from said leads and revolving in a regulable magnetic field, and means for varying the strength of the magnetic field for each armature independently of the others in accordance with the progress of the charge and consequent increase of electro-motive force in the battery in the same branch.

6. The combination, substantially as described, in an apparatus for charging storage-batteries, of a pair of charging mains or leads of substantially constant potential, branches from said leads, each containing means for placing a storage-battery in circuit between them, a supplemental machine in one of said branches consisting of a motor, the variable counter electro-motive force of which may assist the counter electro-motive force of the battery during the charging operation, and a second machine in another branch driven by any suitable prime mover, as a dynamo-electric machine, to assist the main charging-current, the armatures of said machines being mechanically connected, as and for the purpose described.

7. The combination, substantially as described, with a main charging-generator and a storage-battery to be charged thereby, of a supplemental electro-motive-force generator placed in the circuit between the two and having a variable electro-motive-force capacity and provided with means for varying its capacity as an electro-motive-force generator as the state of charge of the battery varies.

8. In an apparatus for charging storage-batteries, the combination, with a main charging dynamo or dynamos, of means for connecting a storage-battery therewith and a supplemental armature in the connection between the battery and main dynamo acting as a counter-electro-motive-force generator assisting the counter electro-motive force of the battery in circuit with it and of regulable power in accordance with the progress of the charge and consequent increase of counter electro-motive force of said battery.

9. The combination, substantially as described, of a main charging-dynamo, a storage-battery to be charged thereby, and an armature acting as a supplemental electro-motive-force generator to assist the counter electro-motive force of the battery or the electro-motive force of the charging-current during charging of said battery, said armature revolving in a regulable magnetic field.

Signed at New York, in the county of New York and State of New York, this 22d day of April, A. D. 1891.

CYPRIEN O. MAILLOUX.

Witnesses:
    WM. H. CAPEL,
    T. F. CONREY.